United States Patent
Perakes et al.

(10) Patent No.: US 8,376,887 B2
(45) Date of Patent: Feb. 19, 2013

(54) POWER TRANSFER UNIT DRIVE DISCONNECT SYSTEM

(75) Inventors: Andreas E. Perakes, Canton, MI (US); Matthew D. Hammond, Derborn, MI (US); Laurence A. Deutsch, Farmington Hills, MI (US); Steven A. Frait, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 410 days.

(21) Appl. No.: 12/838,534

(22) Filed: Jul. 19, 2010

(65) Prior Publication Data

US 2012/0015770 A1    Jan. 19, 2012

(51) Int. Cl.
*F16H 48/20* (2012.01)
*F16H 37/06* (2006.01)

(52) U.S. Cl. .................................. 475/86; 475/332

(58) Field of Classification Search .................... 475/86, 475/220, 332

See application file for complete search history.

(56) References Cited

U.S. PATENT DOCUMENTS

| 6,152,848 | A | 11/2000 | Williams et al. |
| 6,726,591 | B2 | 4/2004 | Maruyama et al. |
| 7,004,874 | B2 | 2/2006 | Mizon et al. |
| 7,150,694 | B2 | 12/2006 | Mizon et al. |
| 7,311,633 | B2 | 12/2007 | Maruyama et al. |
| 2002/0061801 | A1 | 5/2002 | Amanuma et al. |
| 2003/0024753 | A1 | 2/2003 | Maruyama et al. |
| 2008/0300086 | A1* | 12/2008 | Wheals .................. 475/248 |

* cited by examiner

*Primary Examiner* — Edwin A Young

(74) *Attorney, Agent, or Firm* — James Dottavio; MacMillan, Sobanski & Todd LLC

(57) ABSTRACT

A drive system includes a rotating power source, a planetary differential including a ring gear engaged with the power source, a sun gear secured to a first shaft and a carrier secured to a second shaft, a member secured to an output shaft, and a coupler alternately connecting and disconnecting the member and the ring gear.

17 Claims, 1 Drawing Sheet

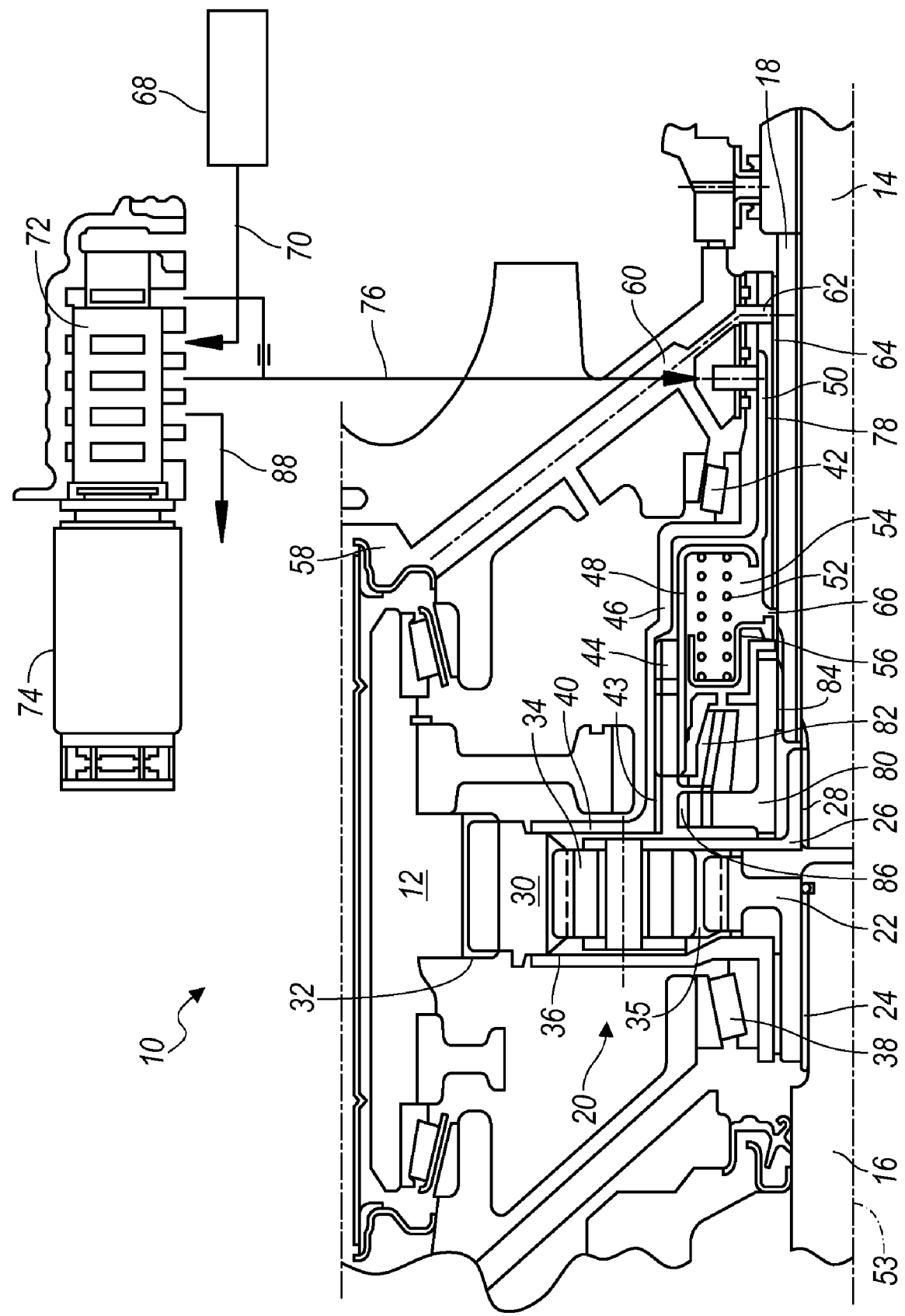

POWER TRANSFER UNIT DRIVE DISCONNECT SYSTEM

BACKGROUND OF THE INVENTION

1. Field of the Invention

This invention relates generally to a motor vehicle driveline, which in operation transmits power continually to a first wheel set and selectively to a second wheel set.

2. Description of the Prior Art

Power transfer unit (PTU) efficiency is a concern in all wheel drive (AWD) vehicles derived from front wheel drive vehicle platforms, partially due to kinematics dictated by the speed and torque of the transmission output. For example, an AWD powertrain typically reduces fuel economy by about five percent compared to a front wheel drive (FWD) powertrain.

Driveline disconnects are a well established improvement method in rear wheel drive powertrains, but are absent from FWD products. A principal difference between FWD-based and RWD-based AWD products is the transfer case used on RWD-based products provides a convenient disconnect point. In FWD-based powertrains, the relatively small package space available for the power transfer unit makes implementation of driveline disconnects on FWD-based products very challenging.

A need exists in the automotive industry for a front disconnect located ahead of a power takeoff unit in order to optimize fuel efficiency of the powertrain by minimizing in FWD operation the number of rotating components when AWD is not selected. Preferably the package space required for the disconnect permits the PTU drive system to be located within the transaxle case.

SUMMARY OF THE INVENTION

A drive system includes a rotating power source, a planetary differential including a ring gear engaged with the power source, a sun gear secured to a first shaft and a carrier secured to a second shaft, a member secured to an output shaft, and a coupler alternately connecting and disconnecting the member and the ring gear.

The drive system produces an increase in fuel economy by locating the disconnect between the power source and the secondary wheel set ahead of the PTU bevel pinion and mating bevel gear.

The drive system can be located within the casing of a transaxle, thereby reducing the required package space.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

The FIGURE is a cross section showing a drive system that connects a power source continually to a primary wheel set and selectively to a secondary wheel set.

DESCRIPTION OF THE PREFERRED EMBODIMENT

The drawing illustrates a drive system 10 that continually connects a power source to a primary wheel set, preferably the front wheels of a motor vehicle, and selectively connects the power source to a secondary wheel set, preferably the rear wheels. The power source is a transmission output shaft 12. Rotating power is transmitted to the wheels of the primary wheel set through a right-hand axle shaft 14 and a left-hand axle shaft 16. Power is selectively transmitted to the wheels of the secondary wheel set through a power transfer unit (PTU) input shaft 18.

A compound planetary differential 20 includes a sun gear 22, secured through a spline 24 to axle shaft 16; a carrier 26, secured through a spline 28 to axle shaft 14; a ring gear 30, engaged with an pinion 32 formed on the transmission output shaft 12; first planet pinions 34 supported on the carrier and meshing with the ring gear 30; and second planet pinions 35 supported on the carrier and meshing with the sun gear 22 and the first planet pinions 34. One side of ring gear 30 is secured to a disc 36 and supported at a bearing 38; the other side of ring gear 30 is secured to a disc 40 and supported at a bearing 42. Disc 40 is formed with an internal spline 43, which engages an external spline formed on a coupler sleeve 44.

Disc 40 forms a cylinder 46, which contains a piston 48, actuated by pressurized hydraulic fluid carried to cylinder 46 through a passage 50. A compression return spring 52 restores piston 48 to the disengaged position shown in the FIGURE. Piston 48 is secured to coupler sleeve 44 such that they move along an axis 53 and rotate about axis 53 as a unit.

The volume 54 enclosed by piston 48 and spring retainer 56 forms a balance dam containing hydraulic fluid supplied from source of hydraulic lubricant 58 through a lube circuit, which includes passages 60, 62, 64, 66.

In operation, fluid from source of line pressure 68 is carried in passage 70 to a valve 72, which is controlled by a variable force solenoid 74. Valve 72 opens and closes a connection between line pressure source 68 and passages 76, 78, which carry piston-actuating pressure to cylinder 46 depending on the state of solenoid 74. When passages 76 and 78 are pressurized, piston 48 and coupler sleeve 44 moves leftward, causing frictional contact at the conical surface between a member 80 and a synchronizing ring 82. Member 80 is rotatably secured by spline 84 to PTU input shaft 18. As the speed of member 80 is synchronized with the speed of ring gear 30, the internal spline of coupler sleeve 44 engages the dog teeth on synchronizing ring 82 and the clutch teeth 86 on the radial outer surface of connecting member 80, thereby driveably connecting ring gear 30 and PTU input shaft 18.

When passages 76 and 78 are vented through valve 72 and passage 88, piston 48 and sleeve 44 move rightward to their disengaged positions, causing connecting member 80 to disengage the ring gear 30, thereby disconnecting ring gear 30 from PTU input shaft 18.

Although the description refers to the speed of connecting member 80 being synchronized with the speed of ring gear 30 using a synchronizer, a connection between the ring gear and PTU input shaft 18 can be completed using a coupler instead of a synchronizer.

In accordance with the provisions of the patent statutes, the preferred embodiment has been described. However, it should be noted that the alternate embodiments can be practiced otherwise than as specifically illustrated and described.

The invention claimed is:

1. A drive system, comprising:
a rotating power source;
a planetary differential including a ring gear engaged with the power source, a sun gear secured to a first shaft and a carrier secured to a second shaft;
a member secured to an output shaft; and
a coupler that synchronizes speeds of the member and the ring gear and connects and disconnects the ring gear and the member.

2. The system of claim 1, further comprising:
a fluid pressure source;
a valve including a supply port connected to the pressure source, a vent port, and a outlet port; and
a solenoid for opening and closing a first connection between the supply port and a second connection between the vent port and the supply port.

3. The system of claim 2, further comprising:
a cylinder hydraulically connected to the supply port and rotatably connected to the ring gear;
the coupler includes a sleeve secured to the cylinder for rotation therewith; and
a piston located in the cylinder, actuated by pressure in the cylinder to move the sleeve into engagement with the member.

4. The system of claim 3, further comprising:
a return spring applying a force to the piston, the force tending to disengage the sleeve from the member.

5. The system of claim 3, further comprising:
a balance dam containing hydraulic fluid having a pressure that bears on the piston in opposition to actuating pressure in the cylinder.

6. The system of claim 3, further comprising:
a source of hydraulic lubricant; and
a balance dam communicating with the source of hydraulic lubricant, lubricant in the balance dam having a pressure that bears on the piston in opposition to actuating pressure in the cylinder.

7. A drive system, comprising:
a rotating power source;
a differential driveably connected to the power source, a first shaft and a second shaft;
a member secured to an output shaft; and
a hydraulically actuated coupler alternately connecting and disconnecting the member and the power source through the differential;
a fluid pressure source;
a valve including a supply port connected to the pressure source, a vent port, and a outlet port; and
a solenoid for opening and closing a first connection between the supply port and a second connection between the vent port and the supply port.

8. The system of claim 7, wherein the coupler further comprises a synchronizer that synchronizes the speed of the member with the speed of an input of the differential power source before connecting a ring gear and the member.

9. The system of claim 7, further comprising:
a cylinder hydraulically connected to the supply port and rotatably connected to the power source;
the coupler includes a sleeve secured to the cylinder for rotation therewith; and
a piston located in the cylinder, actuated by pressure in the cylinder to move the sleeve into engagement with the member.

10. The system of claim 9, further comprising:
a return spring applying a force to the piston, the force tending to disengage the sleeve from the member.

11. The system of claim 9, further comprising:
a balance dam containing hydraulic fluid having a pressure that is applied to the piston in opposition to actuating pressure in the cylinder.

12. The system of claim 9, further comprising:
a source of hydraulic lubricant; and
a balance dam communicating with the source of hydraulic lubricant, lubricant in the balance dam having a pressure that is applied to the piston in opposition to actuating pressure in the cylinder.

13. A drive system, comprising:
a rotating power source;
a differential including an input driveably connected to the power source for transmitting power from the power source through the input to a first shaft and a second shaft;
a member secured to an output shaft;
a coupler alternately connecting and disconnecting the member and the power source through the input;
a fluid pressure source;
a valve including a supply port connected to the pressure source, a vent port, and a outlet port; and
a solenoid for opening and closing a first connection between the supply port and a second connection between the vent port and the supply port.

14. The system of claim 13, wherein the coupler further comprises a synchronizer that synchronizes the speed of the member with the speed of the input before connecting a ring gear and the member.

15. The system of claim 14, further comprising:
a cylinder hydraulically connected to the supply port and rotatably connected to the power source;
the coupler includes a sleeve secured to the cylinder for rotation therewith; and
a piston located in the cylinder, actuated by pressure in the cylinder to move the sleeve into engagement with the member.

16. The system of claim 15, further comprising:
a balance dam containing hydraulic fluid having a pressure that is applied to the piston in opposition to actuating pressure in the cylinder.

17. The system of claim 15, further comprising:
a source of hydraulic lubricant; and
a balance dam communicating with the source of hydraulic lubricant, lubricant in the balance dam having a pressure that is applied to the piston in opposition to actuating pressure in the cylinder.

* * * * *